(12) United States Patent
Ho

(10) Patent No.: US 6,808,281 B2
(45) Date of Patent: Oct. 26, 2004

(54) BACKLIGHT MODULE HAVING CONCAVE STRUTURE

(75) Inventor: Yi-Chun Ho, Chung-Ho (TW)

(73) Assignee: Quanta Display Incorporation, Taipei (TW)

( * ) Notice: Subject to any disclaimer, the term of this patent is extended or adjusted under 35 U.S.C. 154(b) by 41 days.

(21) Appl. No.: 10/319,940

(22) Filed: Dec. 14, 2002

(65) Prior Publication Data

US 2004/0114343 A1 Jun. 17, 2004

(51) Int. Cl.[7] .................................................. F21V 7/04
(52) U.S. Cl. ........................ 362/31; 362/225; 362/247; 362/309; 362/348
(58) Field of Search .......................... 362/31, 225, 561, 362/241, 245, 247, 307–309, 327, 330, 347, 348; 349/65, 67, 70

(56) References Cited

U.S. PATENT DOCUMENTS

| | | | | |
|---|---|---|---|---|
| 4,965,950 A | * | 10/1990 | Yamada | 362/31 |
| 5,555,160 A | * | 9/1996 | Tawara et al. | 362/31 |
| 5,575,549 A | * | 11/1996 | Ishikawa et al. | 362/31 |
| 6,152,569 A | * | 11/2000 | Aizawa | 362/31 |
| 6,561,663 B2 | * | 5/2003 | Adachi et al. | 362/31 |
| 2002/0018341 A1 | * | 2/2002 | Torihara et al. | 362/31 |

* cited by examiner

Primary Examiner—Alan Cariaso (57) ABSTRACT

A backlight module includes a light guide plate having opposite ends. The light guide plate has a light emitting surface and an opposite back surface connected to each other by the ends. The back surface has a concave contour whereby thickness of the light guide plate is gradually reduced from each end toward a center of the light guide plate. A light source includes a reflector mounted to each end of the light guide plate and a plurality of light tubes fixed inside the reflector and between the reflector and the end of the light guide plate. The light tubes are lined up in a direction inclined with respect to a normal direction of the light emitting surface. The reflector includes curved portions corresponding to the light tubes for reflecting light from the light tubes toward the end of the light guide plate. A reflective layer is formed on the back surface. The reflective layer defines a number of miniature cups having a hemispherical or multilateral pyramid configuration for reflecting light toward the light emitting surface.

9 Claims, 7 Drawing Sheets

BACKLIGHT MODULE HAVING CONCAVE STRUTURE

FIELD OF THE INVENTION

The present invention relates generally to a backlight module, and in particular to a backlight module having a reduced weight while maintaining high luminance and uniform brightness throughout a light emitting surface thereof.

BACKGROUND OF THE INVENTION

Backlight modules having reduced weight and minimized structure and size are known, such as Japan Patent Laid Open No. 21883/2001 which comprises two opposite glass plates between which polarizer, retarder, diffuser, color film, transparent electrode and liquid crystal layer are sequentially interposed. Corrugation is formed on the glass plate that faces a viewer for providing a front light.

Japan Patent Laid Open Nos. 00017/1990 and 84618/1990 disclose structures of planar light source, comprising a light guide plate having a light incident surface, a light emitting surface which is normal to the light incident surface and a light reflective surface that is opposite to the light incident surface and a light extraction mechanism forming a light source that is arranged on opposite ends of the light guide pipe. A light control sheet comprises a prism array disposed adjacent to the light emitting surface of the light guide pipe and comprising a number of triangular prisms having apexes pointing toward the light emitting surface of the light guide plate whereby a generating line of each prism is substantially parallel to the light source. A reflecting sheet is arranged adjacent to the light reflecting surface of the light guide plate.

Japan Patent Laid Open No. 84618/1990 teaches a technique for surface-roughing treatment of the light emitting surface of the light guide plate.

These prior art references provide techniques for projecting light in a given direction. However, they are not able to provide a uniform brightness throughout the light emitting surface. In addition, heretofore, the known planar light source devices are not able to provide wide viewing angles to be adapted in liquid crystal display or other thin thickness display devices, such as thin thickness television set.

Figure 1:
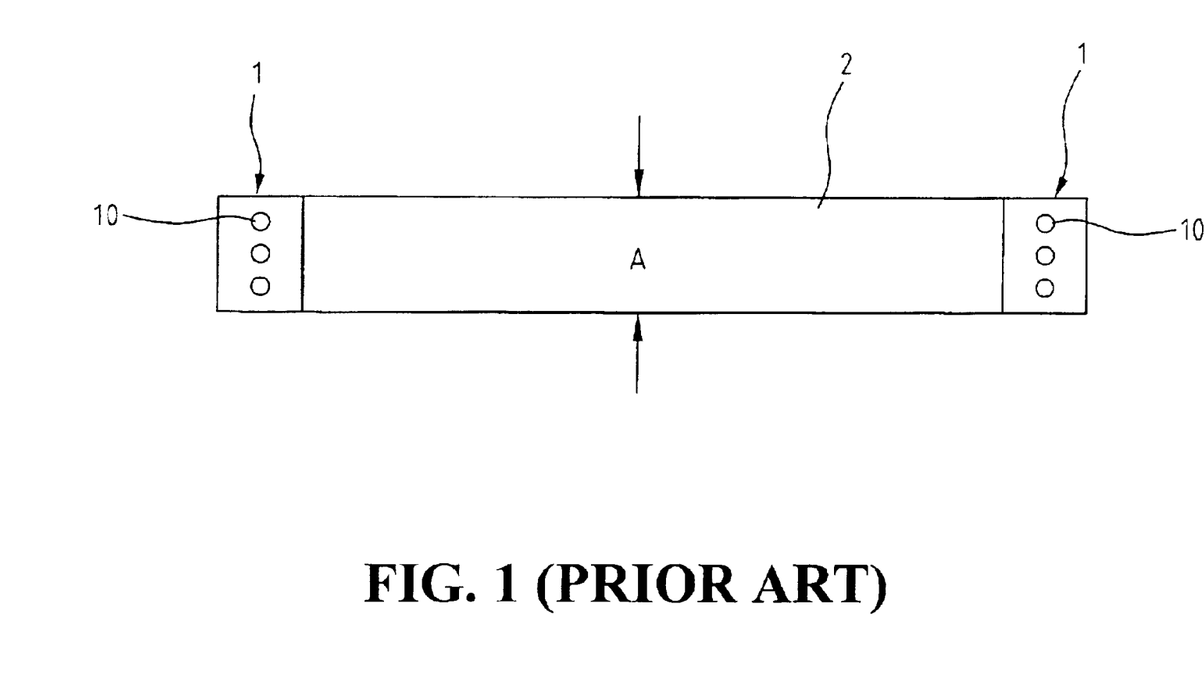
FIG. 1 is a schematic side elevational view of a conventional backlight module.
Figure 2:
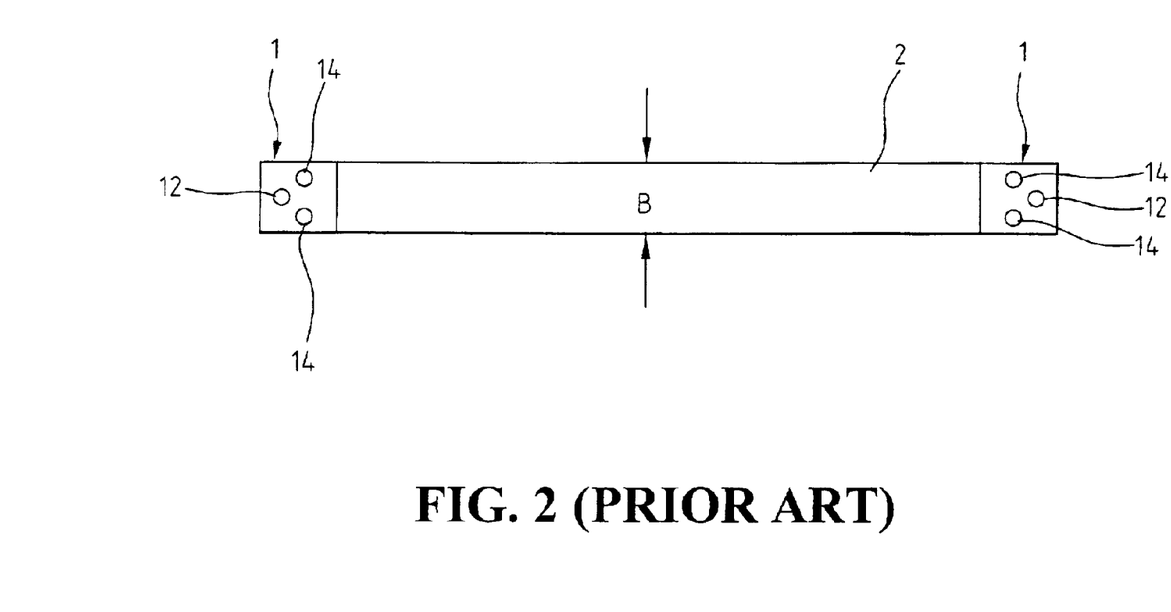
FIG. 2 is a schematic side elevational view of another conventional backlight module.

On the other hand, the light source for a backlight module is commonly arranged on opposite ends of the backlight module. Light intensity from a light source comprised of a single light tube is sufficient to illuminate a light guide plate for liquid crystal display (LCD) panels having small sizes. However, for large sized LCD panels, a single tube light source is not able to provide uniform brightness throughout the whole panel. Additional light tubes are thus required to provide an acceptable brightness for illuminating the panel. FIGS. 1 and 2 of the attached drawings show conventional configurations for arrangement of more than one light tube in a light source for an LCD panel.

As shown in FIG. 1, a backlight module for a LCD panel comprises a light guide plate 2 and light sources 1 arranged on opposite ends of the light guide plate 2. Each light source 1 comprises three light tubes 10 lined up in a vertical direction or a direction normal to the LCD panel. Lining up three light tubes 10 inevitably increases the overall thickness A of the backlight module, which is against the trend of minimization. Practically, the thickness A of the backlight module having light source comprised of three tubes is around 10–13 mm.

In FIG. 2, a different arrangement of light tubes is shown. Two light sources 1, each comprised of three light tubes 12, 14, are arranged on opposite ends of a light guide plate 2. The light tubes 12, 14 are arranged in two columns and the tubes of each column alternate each other to reduce the overall thickness B of the backlight module. Practically, the thickness B is around 8 mm, which is substantially smaller than the technique illustrated in FIG. 1. However, the light tubes 14 that are arranged between the light tube 12 and the light guide plate 2 become obstacles for the light from the light tube 12 thereby causing loss of energy and reducing the luminance that can be provided by the backlight module.

Thus, it is desired to have a backlight module that overcomes the above problems.

SUMMARY OF THE INVENTION

An object of the present invention is to provide a backlight module that has sufficient and uniform brightness throughout a light emitting surface of a backlight module.

Another object of the present invention is to provide a backlight module that has reduced weight while maintaining a uniform and sufficient brightness.

A further object of the present invention is to provide a backlight module in which energy loss is eliminated or minimized.

To achieve the above objects, in accordance with the present invention, there is provided a backlight module comprising a light guide plate having opposite ends. The light guide plate has a light emitting surface and an opposite back surface connected to each other by the ends. The back surface has a concave contour whereby thickness of the light guide plate is gradually reduced from each end toward a center of the light guide plate. A light source comprises a reflector mounted to each end of the light guide plate and a plurality of light tubes fixed inside the reflector and between the reflector and the end of the light guide plate. The light tubes are lined up in a direction inclined with respect to a normal direction of the light emitting surface. The reflector comprises curved portions corresponding to the light tubes for reflecting light from the light tubes toward the end of the light guide plate. A reflective layer is formed on the back surface. The reflective layer defines a number of miniature cups having a hemispherical or multilateral pyramid configuration for reflecting light toward the light emitting surface.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE INVENTION

Figure 3:
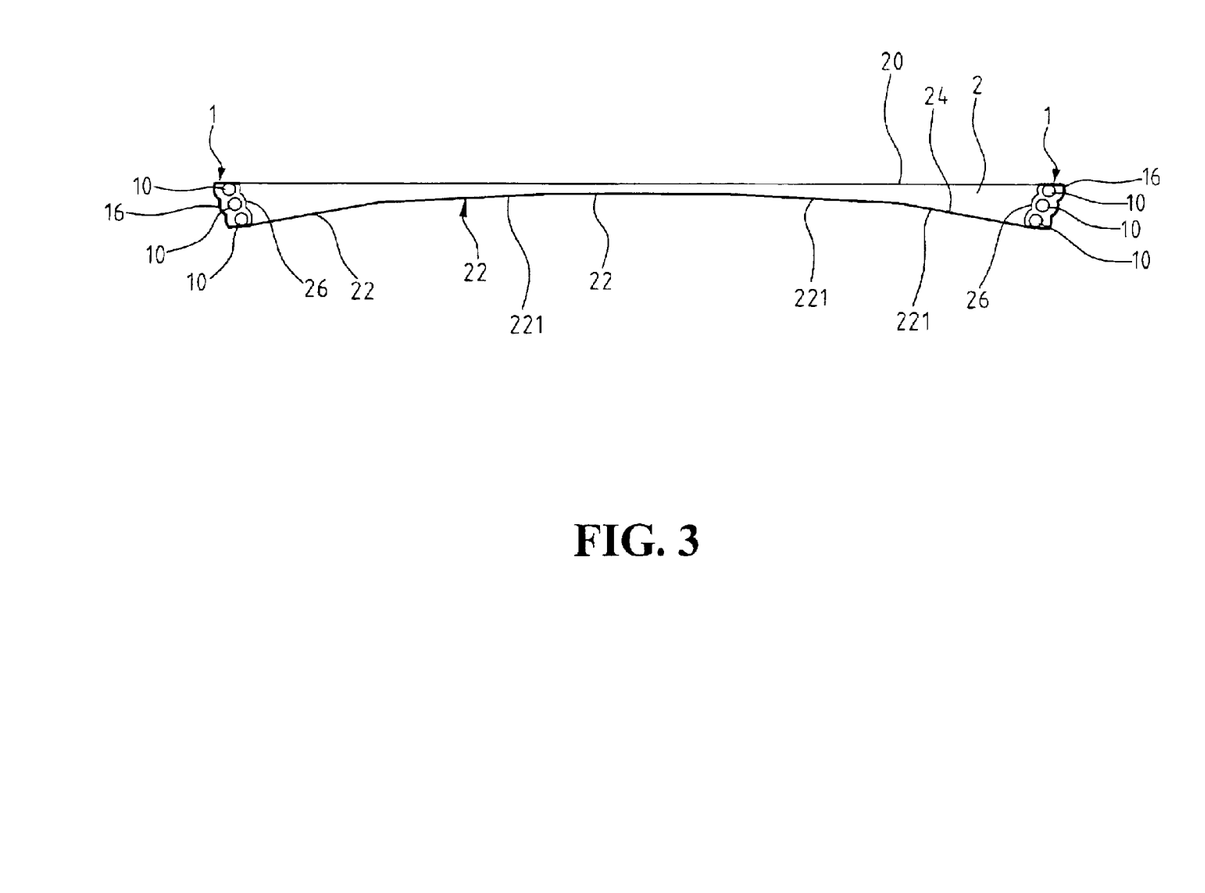
FIG. 3 is a side elevational view of a backlight module constructed in accordance with a first embodiment of the present invention.
Figure 4:
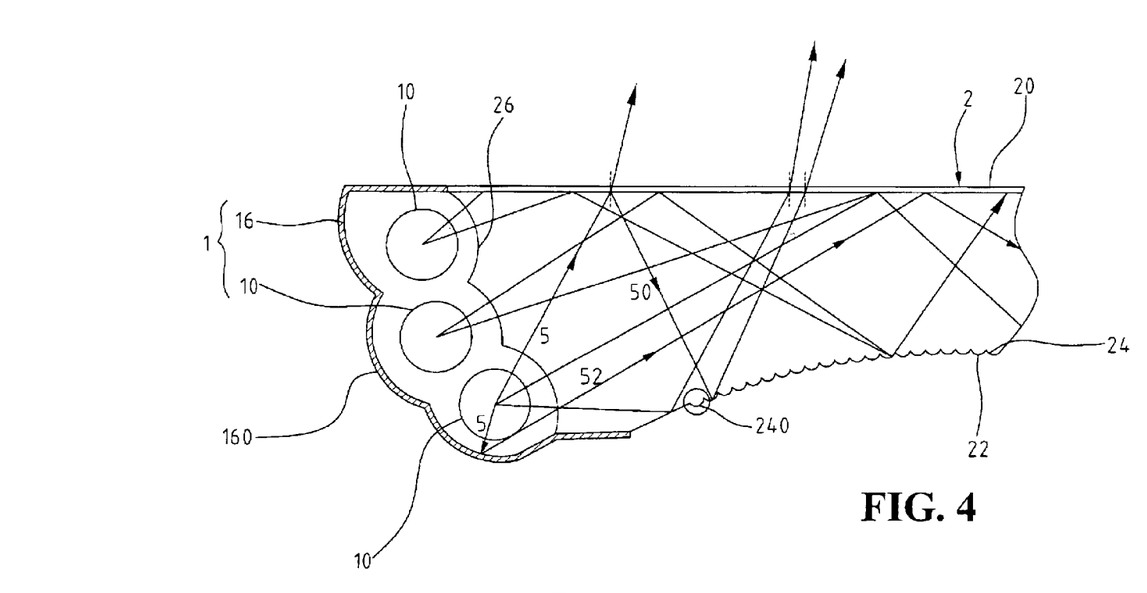
FIG. 4 is an enlarged view of a light source of the backlight module of FIG. 3.

With reference to the drawings and in particular to FIGS. 3 and 4, a backlight module constructed in accordance with a first embodiment of the present invention comprises a light guide plate 2 having opposite ends 26 to which light sources 1 are respectively mounted. The light guide plate 2 has a flat light emitting surface 20 and an opposite back surface 22 connected to each other by the ends 26. A reflective layer 24 is formed on the back surface 22. In the embodiment illustrated, the back surface 22 is comprised of a number of sections 221 that are inclined with respect to each whereby thickness of the light guide plate 2 which is the dimension between the light emitting surface 20 and the back surface 22 is gradually reduces from opposite ends 26 of the light guide plate 2 toward a center of the light guide plate 2. In other words, the back surface 22 forms a concave contour and each end portion of the light guide plate 2 forms a converging configuration from the end 26 toward the center. The thickness at the ends 26 of the light guide plate 2, which is around 6–8 mm in a practical example, is greater than that at the center of the light guide plate 2, which is around 4–6 mm. Preferably, the light guide plate 2 has a symmetric configuration whereby the thickness at the ends 26 of the light guide plate 2 is the same.

The light sources 1 comprise three tubes 10 fixed inside a lamp reflector 16 that is mounted to the end 26 of the light guide plate 2 whereby the light tubes 10 are substantially located between the lamp reflector 16 and the end 26 of the light guide plate 2. In the embodiment illustrated, the light tubes 10 are lined up in a direction inclined with respect to a normal direction of the light emitting surface 20 of the light guide plate 2 The light tubes 10 give off light, designated with reference numeral 5, that directly travels into the light guide plate 2 through the end 26 or is reflected by the lamp reflector 16 as a reflected light 52 transmitting back into the light guide plate 2 through the end 26. The converging configuration of the end section of the light guide plate 2 helps guiding the light toward a central section of the light guide plate 2. Light that is caused by internal total reflection to move from the light emitting surface 20 toward the back surface 22, such as the light designated with reference numeral 50, is reflected by the reflective layer 24 of the back surface 22 and is thus guided back toward the light emitting surface 20. This helps enhancing the brightness of the light guide plate 2.

The lamp reflector 16 is comprised of at least one curved portion 160 of which the curvature is determined in accordance with Snell's law in order to effectively reflect and focus the light incident thereon back into the light guide plate 2 to avoid loss of energy. If desired, the end 26 of the light guide plate 2 may be formed with curved sections corresponding to the light tubes 10.

Figure 4A:
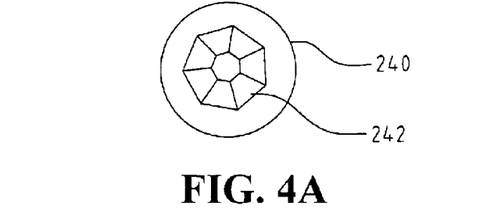
FIG. 4A is an enlarged plan view of a miniature cup of a reflective layer encircled and marked with reference numeral 4A in FIG. 4.

Also referring to FIG. 4A, the reflective layer 24 forms a plurality of miniature cups 240 to provide a unique effect of reflection. Each cup 240 is comprised of a number of flat faces 242 forming a multilateral pyramid cavity. Each face 242 reflects light coming from different directions. The arrangement of the faces 242 is based on Snell's law whereby light incident on the back surface 22 can be effectively reflected toward the light emitting surface 20.

Figure 5:
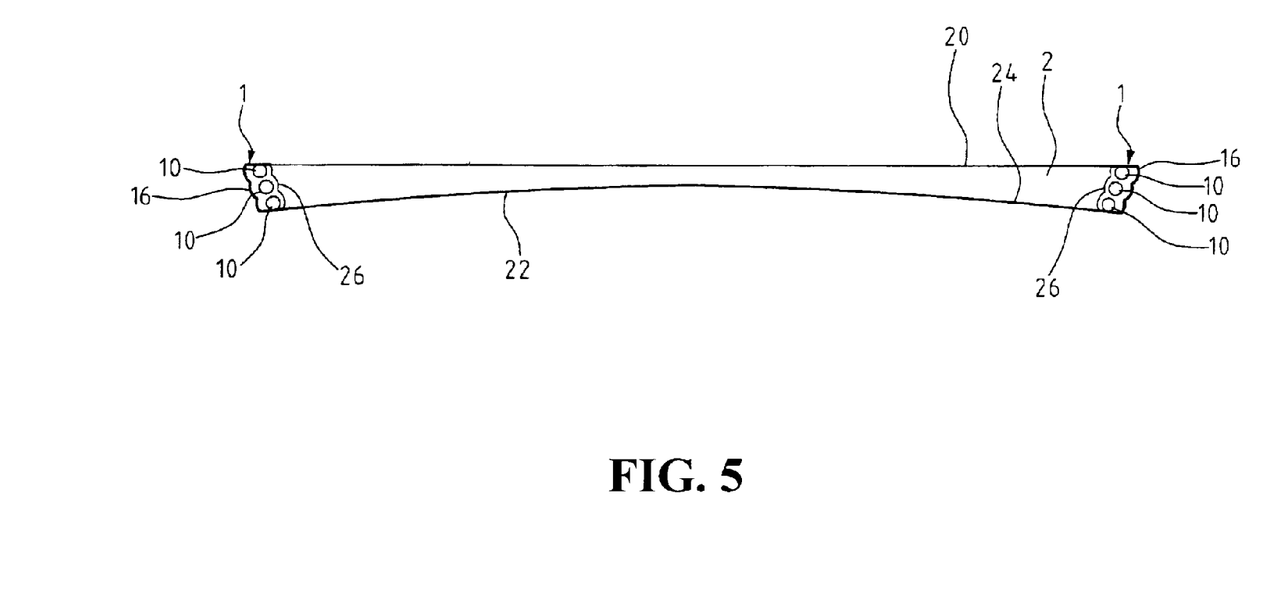
FIG. 5 is a side elevational view of a backlight module constructed in accordance with a second embodiment of the present invention.
Figures 6, 6A:
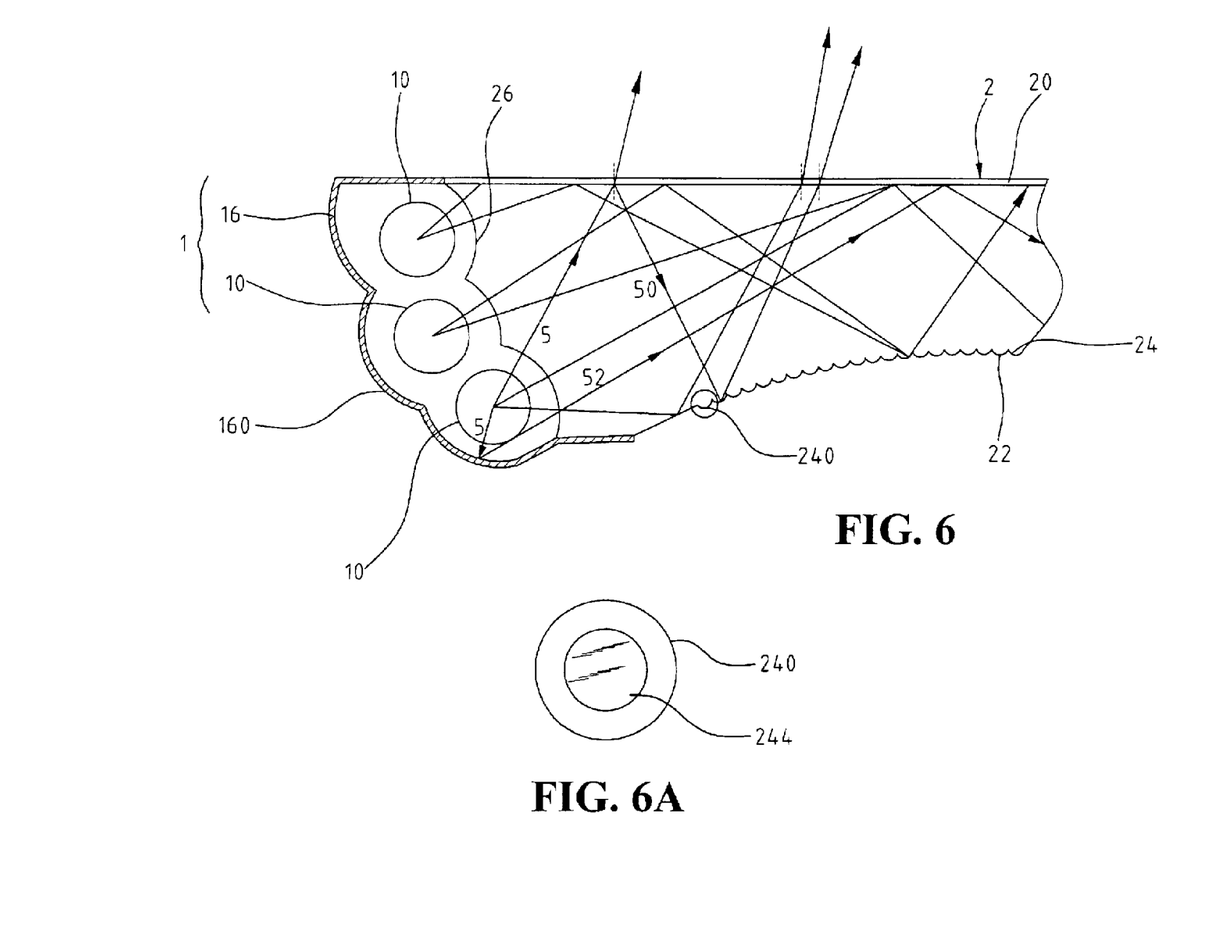
FIG. 6 is an enlarged view of a light source of the backlight module of FIG. 5.
FIG. 6A is an enlarged plan view of a miniature cup of a reflective layer encircled and marked with reference numeral 6A in FIG. 6.
Figure 7:
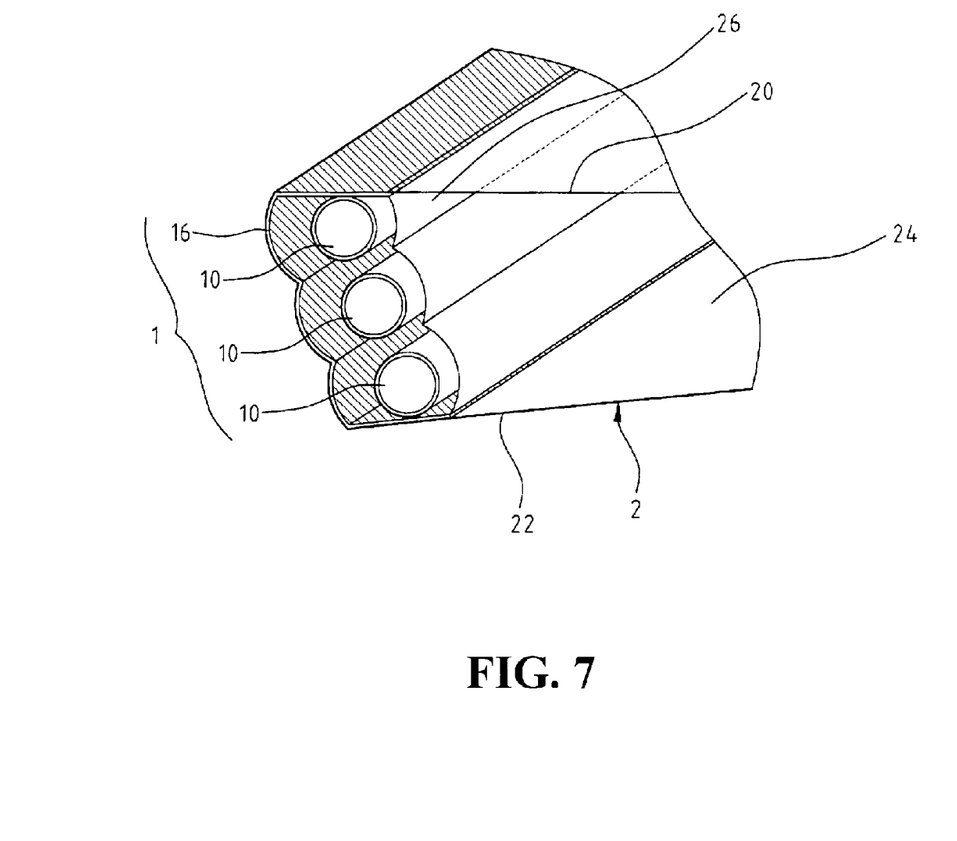
FIG. 7 is a perspective view of FIG. 6.

With reference to FIGS. 5, 6 and 7, a backlight module constructed in accordance with a second embodiment of the present invention comprises a light guide plate 2 having opposite ends 26 to which light sources 1 are respectively mounted. The light guide plate 2 has a flat light emitting surface 20 and an opposite back surface 22 connected to each other by the ends 26. A reflective layer 24 is formed on the back surface 22. In the embodiment illustrated, the back surface 22 has a concave arcuate configuration whereby thickness of the light guide plate 2 which is the dimension between the light emitting surface 20 and the back surface 22 is gradually reduces from opposite ends 26 of the light guide plate 2 toward a center of the light guide plate 2. In other words, the back surface 22 forms a concave contour and each end portion of the light guide plate 2 forms a converging configuration from the end 26 toward the center. The thickness at the ends 26 of the light guide plate 2, which is around 6–8 mm in a practical example, is greater than that at the center of the light guide plate 2, which is around 4–6 mm. Preferably, the light guide plate 2 has a symmetric configuration whereby the thickness at the ends 26 of the light guide plate 2 is the same.

The light sources 1 comprise three tubes 10 fixed inside a lamp reflector 16 that is mounted to the end 26 of the light guide plate 2 whereby the light tubes 10 are substantially located between the lamp reflector 16 and the end 26 of the light guide plate 2. In the embodiment illustrated, the light tubes 10 are lined up in a direction inclined with respect to a normal direction of the light emitting surface 20 of the light guide plate 2 The light tubes 10 give off light, designated with reference numeral 5, that directly travels into the light guide plate 2 through the end 26 or is reflected by the lamp reflector 16 as a reflected light 52 transmitting back into the light guide plate 2 through the end 26. The converging configuration of the end section of the light guide plate 2 helps guiding the light toward a central section of the light guide plate 2. Light that is caused by internal total reflection to move from the light emitting surface 20 toward the back surface 22, such as the light designated with reference numeral 50, is reflected by the reflective layer 24 of the back surface 22 and is thus guided back toward the light emitting surface 20. This helps enhancing the brightness of the light guide plate 2.

The lamp reflector 16 is comprised of at least one curved portion 160 of which the curvature is determined in accordance with Snell's law in order to effectively reflect and focus the light incident thereon back into the light guide plate 2 to avoid loss of energy. If desired, the end 26 of the light guide plate 2 may be formed with curved sections (not labeled) corresponding to the light tubes 10.

Also referring to FIG. 6A, the reflective layer 24 forms a plurality of miniature cups 240 to provide a unique effect of reflection. Each cup 240 forms a hemispherical cavity 244. A hemispherical inner surface of the hemispherical cavity 244 reflects light coming from different directions.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A backlight module comprising:
   a light guide plate having opposite ends, a light emitting surface and an opposite back surface connected to each other by the ends, the back surface having a concave contour wherein thickness of the light guide plate is gradually reduced from each end toward a center of the light guide plate; and a light source comprising a reflector mounted to each end of the light guide plate and a number of light tubes fixed inside the reflector and between the reflector and the end of the light guide plate;

wherein the light tubes are lined up in a direction inclined with respect to a normal direction of the light emitting surface of the light guide plate.

2. The backlight module as claimed in claim 1, wherein the back surface comprises a reflective layer.

3. The backlight module as claimed in claim 2, wherein the reflective layer forms a plurality of cups.

4. The backlight module as claimed in claim 3, wherein each cup has a multilateral pyramid cavity defined by a number of flat faces.

5. The backlight module as claimed in claim 3, wherein each cup has a hemispherical cavity.

6. The backlight module as claimed in claim 1, wherein the back surface has an arcuate configuration.

7. The backlight module as claimed in claim 1, wherein the back surface is comprised of a number of flat sections inclined with respect to each other.

8. The backlight module as claimed in claim 1, wherein the reflector comprises at least one curved portion for reflecting light into the end of the light guide plate.

9. A backlight module comprising:

a light guide plate having opposite ends, a light emitting surface and an opposite back surface connected to each other by the ends, the back surface having a concave contour wherein thickness of the light guide plate is gradually reduced from each end toward a center of the light guide plate; and a light source comprising a reflector mounted to each end of the light guide plate and a number of light tubes fixed inside the reflector and between the reflector and the end of the light guide plate;

wherein the end of the light guide plate forms a curved recess corresponding to each light tube.

\* \* \* \* \*